United States Patent [19]
Schulman

[11] Patent Number: 5,600,632
[45] Date of Patent: Feb. 4, 1997

[54] METHODS AND APPARATUS FOR PERFORMANCE MONITORING USING SYNCHRONIZED NETWORK ANALYZERS

[75] Inventor: Martin A. Schulman, Herndon, Va.

[73] Assignee: Bell Atlantic Network Services, Inc., Arlington, Va.

[21] Appl. No.: 408,254

[22] Filed: Mar. 22, 1995

[51] Int. Cl.⁶ .................................. H04J 1/16; H04J 3/14
[52] U.S. Cl. ...................... 370/252; 370/503; 371/20.1; 340/825.06
[58] Field of Search ................................. 370/13, 14, 17, 370/100.1, 105.1; 375/224, 225; 379/1, 6, 9, 27, 28, 29; 371/3, 15.1, 16.1, 16.2, 16.4, 20.1

[56] References Cited

U.S. PATENT DOCUMENTS

| | | | |
|---|---|---|---|
| 4,817,080 | 3/1989 | Soha | 370/17 |
| 5,101,402 | 3/1992 | Chiu et al. | 370/17 |
| 5,198,805 | 3/1993 | Whiteside et al. | 340/825.06 |
| 5,247,517 | 9/1993 | Ross et al. | 370/17 |
| 5,276,529 | 1/1994 | Williams | 358/406 |
| 5,315,580 | 5/1994 | Phaal | 370/13 |
| 5,375,159 | 12/1994 | Williams | 370/17 |
| 5,410,586 | 4/1995 | Davies | 370/16 |

OTHER PUBLICATIONS

David L. Mills, "Internet Time Synchronization: The Network Time Protocol", IEEE Transactions on Communications, vol. 39, No. 10, pp. 1482–1493, (Oct. 1991).

Primary Examiner—Benedict V. Safourek
Assistant Examiner—Ricky Q. Ngo
Attorney, Agent, or Firm—Lowe, Price, LeBlanc & Becker

[57] ABSTRACT

A plurality of network analyzers are combined into a network performance analysis tool for analyzing complex and widely distributed networks. Each of the network analyzers is synchronized with the others to provide consistency in the application of timestamps to packets traversing the network. Data from all of the analyzers is aggregated and sorted chronically and a variety of processing performed to determine important performance information about various components of the network. This information can then be used directly in simulation of a fully deployed network environment.

9 Claims, 12 Drawing Sheets

| RANGE (MSEC) | BIN | COUNT |
|---|---|---|
| <100 | 1 | 100 |
| 101-150 | 2 | 200 |
| 151-200 | 3 | 400 |
| 201-250 | 4 | 600 |
| 251-300 | 5 | 800 |
| 301-350 | 6 | 600 |
| 351-400 | 7 | 400 |
| 401-450 | 8 | 200 |
| 451-500 | 9 | 100 |

METHODS AND APPARATUS FOR PERFORMANCE MONITORING USING SYNCHRONIZED NETWORK ANALYZERS

TECHNICAL FIELD

This invention relates to the field of telecommunications and more particularly to the field of performance monitoring of communications networks.

BACKGROUND OF THE INVENTION

Network analyzers are devices utilized to connect to communications networks, particularly packet networks, which monitor the signalling state and traffic flow of communications on the network. For example, when digital packet transmission is utilized, a monitor will detect each packet which passes the analyzer connection point and will reproduce some or all of the information being transmitted in its memory. Typically, network analyzers attach a timestamp to each packet received so that information about the number and type of packets passing a given point can be gathered.

The sophistication of networks is growing rapidly. Recently, full service digital networks have been developed which can provide, among other things, video on demand service to a user.

The invention is applicable to a full spectrum of networks. However, the invention will be disclosed in the context of a full service digital network to illustrate only one of several concrete examples.

The operation of such a full service digital network will be described in connection with full service network embodiments depicted in FIGS. 1 and 2. When a subscriber desires to watch television or engage in one of the other services provided by the network, the subscriber activates a set top box known as a digital entertainment terminal (DET) 150 either manually or by a remote control to "turn it on." Turn on may either be an actual power-up or an activation of a DET already powered up. When the DET is turned on, a message is sent over the subscriber link to an optical network unit ONU (151) which services the DET. ONU's are typically located in concentrator bays. The ONU 151 knows the port associated with the DET which has been activated by virtue of either explicit addressing or by virtue of the time slot position of the incoming data. The ONU then initiates a connection to the Level 1 gateway 154 either by way of a distribution component such as digital cross connect switch 152 and ATM Video Switch 155 or by way of ONU 151 or its concentrator and the X.25 network 153. The level 1 gateway then downloads a menu to the DET which has been activated. The menu typically includes the services available to the subscriber at that DET. The subscriber selects a particular service to be invoked and a selection message is sent from the DET 150 to the ONU 151 where it is routed to the level 1 gateway 154. The level 1 gateway knows, by virtue of addressing information applied by the ONU, the ONU number, ONU port number and time slot associated with the DET which requested service. If the service requested is a premium service, such as video-on-demand, the level 1 gateway initiates a connection to an information server (IS) 157 via the level 2 gateway. It notifies the IS of a billing number associated with the subscriber. The server then notifies the level 1 gateway over the reverse path whether or not service is authorized to the subscriber. If service is not authorized, the level 1 gateway will provide a message to the DET and, depending on circumstances, may provide the DET user with an opportunity to subscribe to the service.

If the connection is authorized, the level 1 gateway notifies the PVC controller 156 to activate a permanent virtual circuit between a server port identified by information returned from the server and the port number of the DET desiring the service. Once a communication session is established between the server and the DET requesting service, management of the communication session is transferred to the level 2 gateway 158 of the server and the set up connections are broken down between the level 1 gateway 154 and the DET 150 and between the level 1 gateway 154 and the server 157.

If the subscriber desires to change services, the subscriber may terminate the session with the level 2 gateway and then initiate a new session for establishment of the new service by way of the level 1 gateway.

Figure 2:
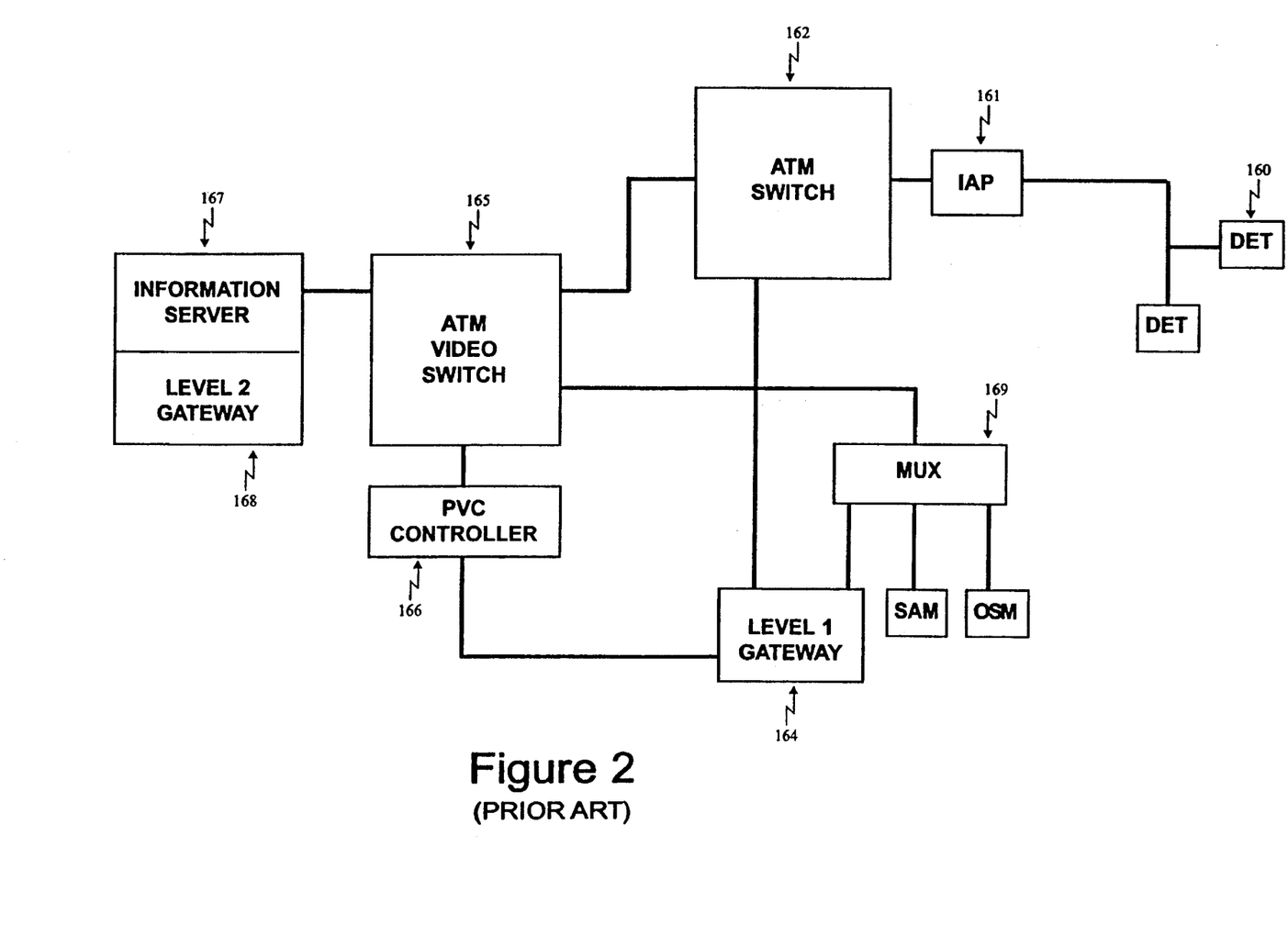
FIG. 2 is a block diagram of a full service network utilizing an ATM switch and an intelligent access peripheral to connect the various users to the level 1 gateway and to the video information providers.

FIG. 2 will be utilized to explain the operation of the full service digital network in another embodiment utilizing an intelligent access peripheral (IAP). As before, when a DET 160 being serviced by an IAP 161 is turned on, a message is sent to the IAP over an upstream Asymmetric Digital Subscriber Line (ADSL) signaling channel. The IAP then initiates a connection to the level 1 gateway which is directly serviced by a port on the ATM switch 162 and the level 1 gateway downloads a menu as before. When the subscriber desires a particular service, and selects that service, a message is sent to the IAP 161. The IAP checks the class of service authorizations contained within a user profile/access management unit to see if the service is authorized to the requesting subscriber. If the service is authorized, the request for services is passed on to the level 1 gateway.

At the level 1 gateway, the particular service selected is identified and a message is sent to the IS 167 over ATM video switch 165 and multiplexer 169. If the server is willing to accept the connection, the server notifies the level 1 gateway over the reverse path and the level 1 gateway specifies the port numbers of the server and the DET to be connected via ATM switches 165 and 162. Once a direct connection between the DET and the IS is established, session management is transferred to the level 2 gateway 168 of the information service provider and connections utilized to set up the call over the ATM switches between the DET and the level 1 gateway and between the level 1 gateway and the ISP are broken down in favor of the direct connection between the DET and the ISP.

As these two examples show, very complicated interactions occur between a user and various components distributed across a full service network. One of the problems associated with design and construction of a network intended to provide functionality never before implemented is that the sizing and capabilities required of the equipment is initially available only as a set of assumptions in the designer's mind. As the network is actually implemented, difficulties arise and problems must be faced which prevent one from creating an efficient system. Since the cost effectiveness of implementations are highly dependent upon the type of equipment purchased, the cost of an overall implementation may become economically infeasible if equipment is sized too large or may become unsatisfactory to a user if sized too small.

To help in designing an economically balanced system, computer simulation is frequently employed simulation permits the designer to experiment with various scenarios without having to invest the money for the equipment in order to establish the efficiency and cost effectiveness of the system and the service levels to be provided to a user.

The problem with simulation is that, in many respects, it is an art form. The intuition of the person building the simulation is utilized to make a variety of implementation decisions which can affect the overall predictions of a simulation model.

To prevent making errors which can be very costly, it is desirable to validate a simulation model. Typically, a number of techniques may be employed to validate a simulation model. One of the more common is to construct a test system and permit users to interact with the test system to determine how users will utilize the system under actual conditions. A great deal of useful information can be obtained through feedback from the users of the test system about what features need to be changed and how the responsiveness of the system impacts the user's work.

When building a nationwide full service network such as described in conjunction with FIGS. 1 and 2, implementation can be expected to cost billions of dollars. However, cost for a local test installation would be very reasonable in comparison. To make design decisions for a nationwide network, one would desire to use a simulation of the fully deployed network to validate that simulation against data collected in the test environment of how the various network elements will perform. With reasonable care in addressing issues of how to scale up a local model to a national one, a test bed validated simulation model will provide much better information about a fully deployed national network than one using only a simulation designer's estimates.

Even a limited test bed of a full service network, may require many miles of wiring plant with devices distributed over the area of the test. Even though one can build individual device models by testing devices in isolation, when devices interact with other components of a network, the results can be quite different. Therefore, it is highly desirable to be able to measure the performance of individual network elements under actual operating conditions of a test bed.

Individual network monitors are unable to provide the kinds of information needed to achieve this.

First, individual network analyzers have only a single point of connection to the network. Therefore, network analyzers of the prior art are unable to trace information flows through multiple steps and devices utilized in the network. Further, a single network analyzer is unable to measure device latencies and the statistics of device latencies under conditions when one kind of input comes in one side and a different type of input emerges from the other side of the device. Typically, a simulation designer will estimate average service request arrivals and assume that they are Poisson distributed. Similarly, the service times for the device are generally assumed to be exponential in the absence of other information.

An individual network monitor provides a myopic perspective of network performance which tends to miss important relationships, especially multivariate relationships, which may be critical to overall network performance. Further, network analyzers have a limited graphic display capability to use and make visible such relationships. Another disadvantage of prior art network analyzers is that they have a limited capability to handle different forms of data. For example, turning to FIG. 1, the arrangement of data received from a DET 150 is different from information provided to ONU 151. That, in turn, has a different protocol and is formatted differently from the information provided to X.25 network 153. The protocols utilized in the connection between the level 1 gateway 154 and ATM video switch 155 are likely different from those utilized to provide information from the level 1 gateway to PVC controller 156. In short, as information traverses a sophisticated network, a variety of communication protocols are utilized which result in a variety of different data formats.

Accordingly, one advantage of the invention is the integration of network performance analyzers which can monitor information at a plurality of points in the network.

Another advantage of the invention is the ability to trace data through multiple points in a complex distributed network.

Another advantage of the invention is the provision of methods and apparatus for measuring latency and statistics of latency for individual devices.

Another advantage of the invention is the provision of a network performance analyzer which views network performance from a multiple viewpoint perspective which can highlight complex relationships.

Another advantage of the invention is the provision of a graphical display of complex multivariate relationships.

Another advantage of the invention is the provision of a network performance analyzer which can follow information flows across multiple portions of a network in which different addressing protocols are utilized.

DISCLOSURE OF THE INVENTION

These and other objects and advantages of the invention are achieved by providing a plurality of network analyzers which are synchronized to a common time base and which provide output to a common analysis tool. This invention permits a more powerful and flexible analysis than has been available using network analyzers of the prior art.

The invention is directed to methods and apparatus for implementing a network performance analyzer having a plurality of network analyzers, each with its own processor and clock. The clocks of the network analyzers are synchronized, or their relative offsets are known, for data capture and the data captured by the network analyzers are aggregated for analysis.

The network analyzers may be synchronized using commercial real time clock boards, a dial up automated computer time service routine or a network time protocol. One technique for synchronizing the docks involves measuring round trip delay and calculating and recording difference values between pairs of clocks. The values of time stamps associated with packets captured are corrected to account for the difference values.

Data captured by said network analyzers are aggregated by causing each network analyzer to dial up a central workstation over a telephone network and download said data inbond or out of bond. Alternatively, network analyzers transmit data to a workstation over a data network or floppy disks can be collected and loaded into a common file.

The aggregated data is sorted chronologically and processed to extract network statistics and other desired information. Desired information is extracted from any of the physical, data link, network, transport, session, presentation or application portions of a protocol utilized to format captured packets. Desired information may include information about network topology as well as one or more of:

a. average packet latency between two points, b. packet latency distribution, c. packet size distribution, d. packet size minimum and/or maximum, e. minimum and/or maximum latency, f. packet fragmentation, g. packet loss, h. packet retransmissions, i. sliding window algorithm efficiency, and j. throughput.

Information produced by the network performance analyzer can be used to drive a network simulator.

The invention is also directed to a method of analyzing network performance by placing a plurality of network analyzers at selected points throughout the network; synchronizing the network analyzers so that time stamps applied to data at the same instant by different network analyzers have identical time stamps; aggregating data captured by said network analyzers; and then analyzing the data to produce network statistics.

The invention is also directed to methods of inferring network topology from a plurality of network analyzers placed at selected points throughout the network by synchronizing the network analyzers so that time stamps applied to data at the same instant by different network analyzers have identical values; aggregating data captured by said network analyzers; and then analyzing said data to infer connections among nodes directly attached to a network analyzer or analyzing said data to infer routing probabilities out of particular nodes.

Still other objects and advantages of the present invention will become readily apparent to those skilled in this art from the following detailed description, wherein only the preferred embodiment of the invention is shown and described, simply by way of illustration of the best mode contemplated of carrying out the invention.

As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
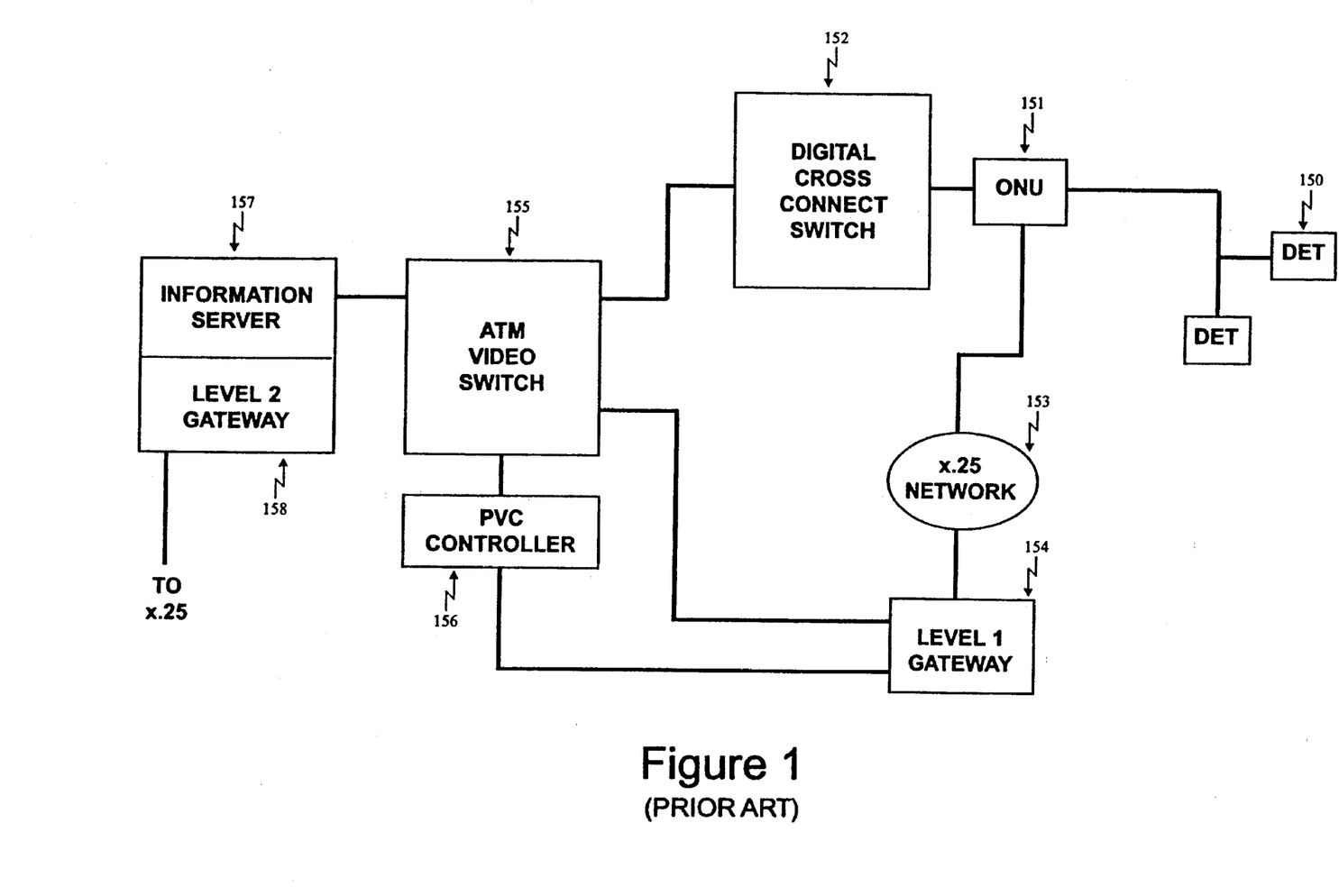
FIG. 1 is a block diagram of a full service network using digital cross connect switching, optical network units and an X.25 network link to a level 1 gateway.
Figure 3:
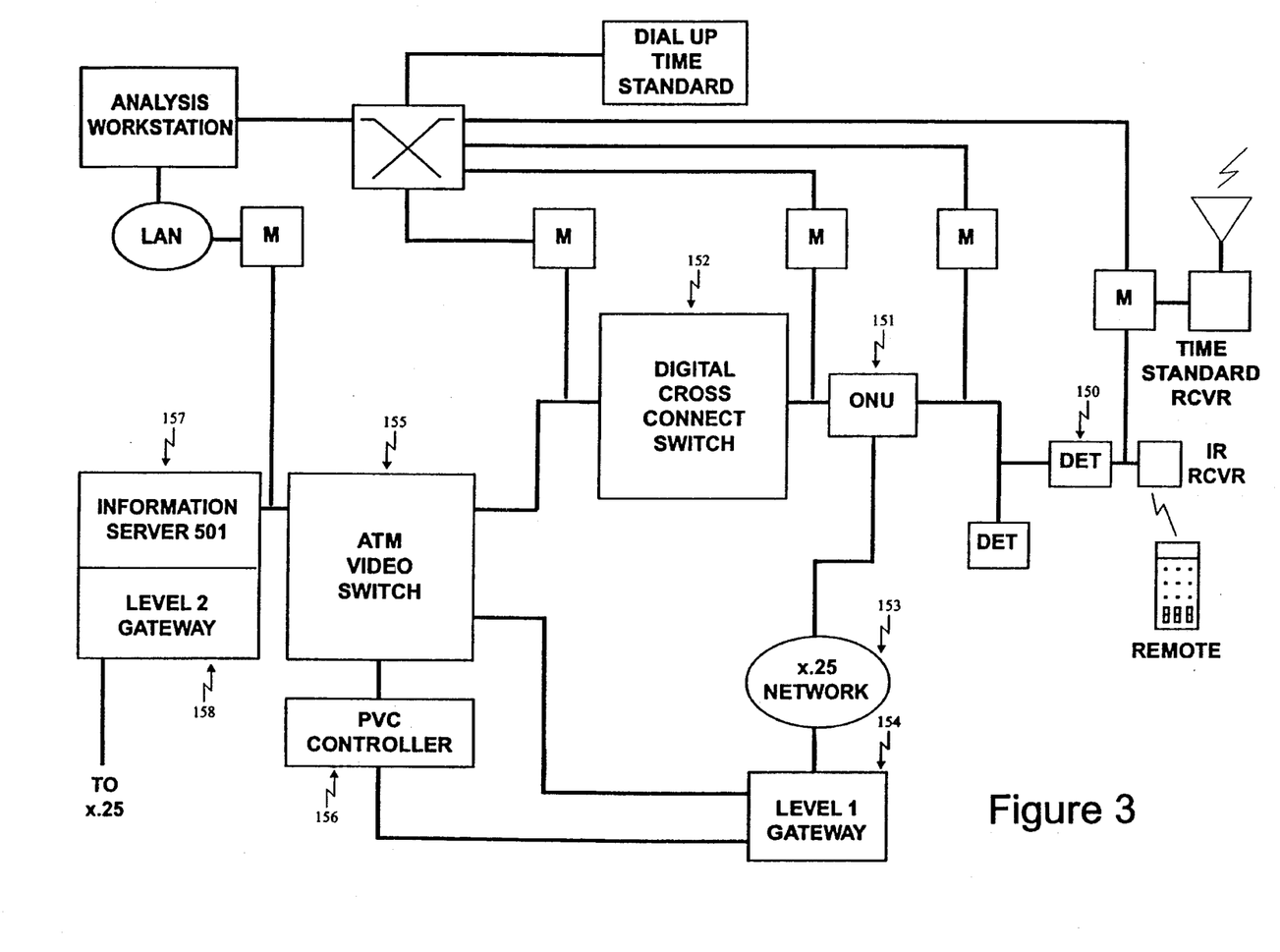
FIG. 3 is an illustration of the network of FIG. 1 equipped with the plurality of network analyzers synchronized through the use of real time clock boards with the capability of synchronizing to an external time standard.

FIG. 3 illustrates a full service network of the type shown in FIG. 1 which has been supplemented with a plurality of monitors (network analyzers) connected to the point shown in order to give a detailed view of packets flowing through the network. Each monitor is a network analyzer of a class which has a processor and expansion slots on a bus. One expansion slot is utilized to accommodate a real time clock board such as the bc630AT real time clock board manufactured by Datum Inc. of San Jose, Calif. The bc630AT offers a means of synchronizing a computer hosting the board to a time standard. Once the computers are synchronized or their relative time offsets are known, the time stamps applied to packets received by the individual network analyzers will be accurate or can be made accurate and consistent across the network. As discussed hereinafter, the data from all of the monitors is gathered together and sorted chronologically for analysis.

One way of aggregating all the data from the network analyzers is to merely collect floppy disks from the individual network analyzers and to append them individually into a large file for analysis.

Figure 4:
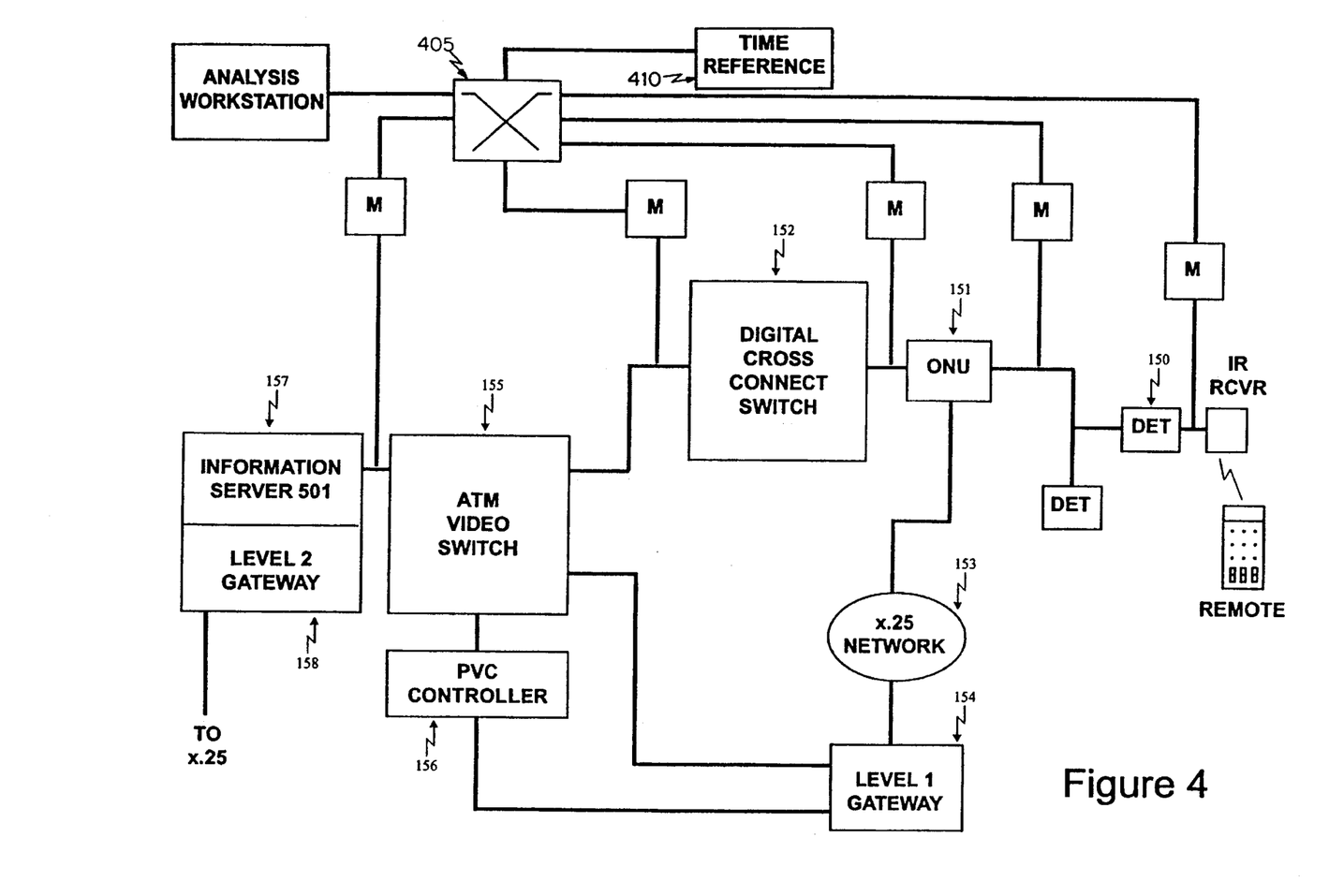
FIG. 4 is an illustration of the network of FIG. 1 in which the network analyzers are equipped to dial up an external time reference over a telephone system to ensure synchronization among the analyzers.

FIG. 4 illustrates another way of synchronizing the clocks of network performance analyzers. In the configuration shown in FIG. 4, individual network monitors M each have a connection to a telephone network 405 which the monitor can utilize to dial up a common time reference 410 for synchronization purposes. The National Institute of Standards and Technology has established an Automated Computer Time Service (ACTS) which is a telephone time service designed to provide computers with telephone access to NIST, with time information at accuracies approaching one millisecond. Features of the service include automated compensation for telephone-line delay, advanced alert for changes to and from daylight saving time and advanced notice of the insertion of leap seconds. NIST provides software routines on a diskette to enable ready access to the automated computer time service. These may be obtained from the NIST Time and Frequency Division, 325 Broadway, Boulder, Colo. 80303.

In use, at pre-programmed intervals, the network analyzers will automatically dial up the automated computer time service and have its clock set in accordance with the standard.

The same dial up link can be utilized to connect each monitor to an analysis work station 400 where its data may be aggregated with that from other monitors for analysis.

Figure 5:
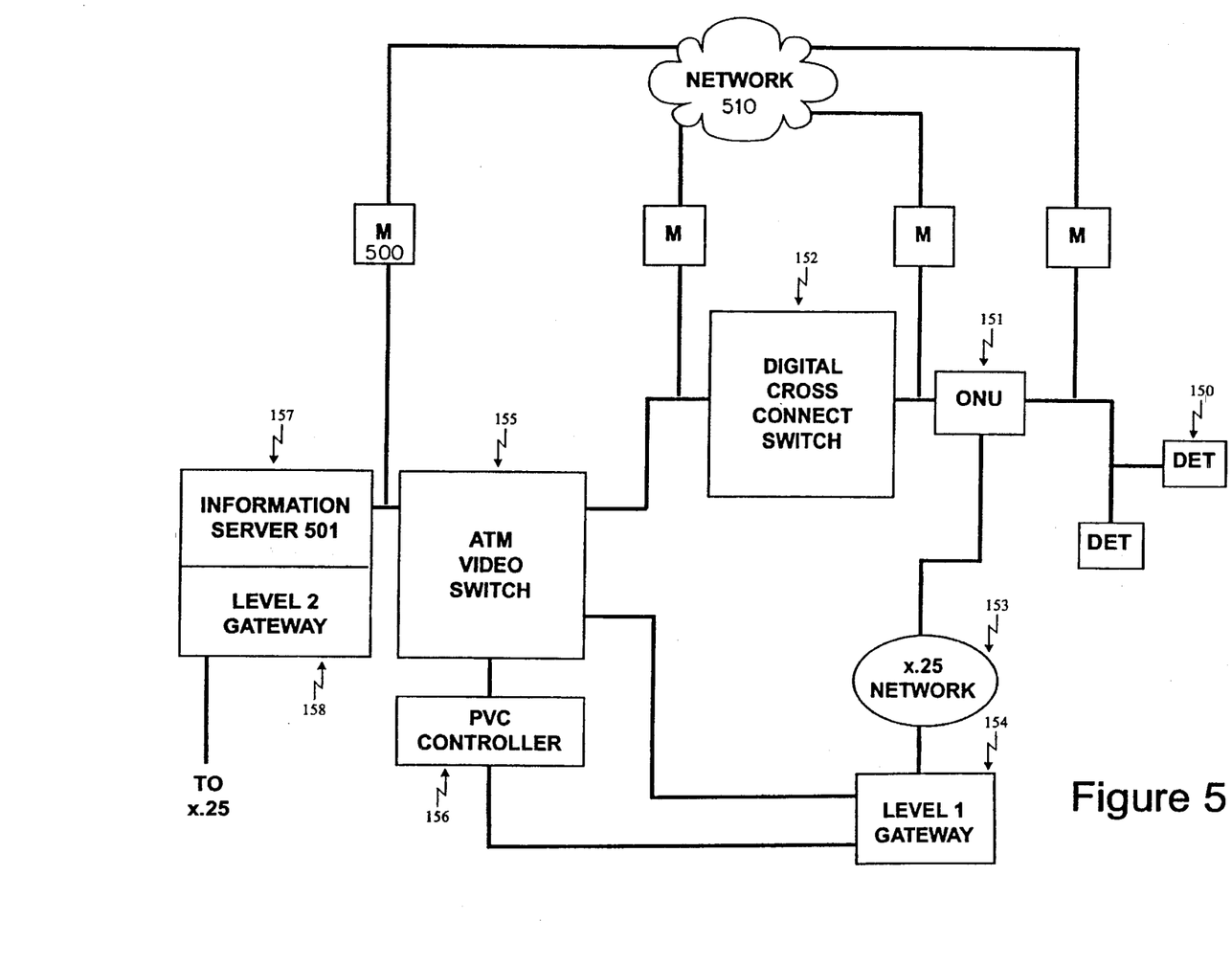
FIG. 5 is an illustration of the network of FIG. 1 in which network analyzers are synchronized using a network time protocol.

FIG. 5 illustrates another synchronization technique using Network Time Protocol. Individual network analyzers 500 are connected over a network 510 of primary and secondary time servers, clients and interconnecting transmission paths. A primary time server is directly synchronized by a primary reference source such an atomic clock. Secondary time servers derive synchronization, possibly via intermediate servers, from a primary server over network paths, most generally shared with other services. Under normal circumstances, clock synchronization is determined using only the most accurate and reliable servers and transmission paths so that the actual synchronization paths usually assume a hierarchial configuration with the primary reference sources at the root and servers of decreasing accuracy at increasing levels toward the leaves. A more complete description of the Network Time Protocol utilized in the FIG. 5 embodiment is found in the article from IEEE Transactions on Communications, Vol. 39, No. 10, October 1991, entitled "Internet Time Synchronization: The Network Time Protocol" by David L. Mills which article is hereby incorporated herein in its entirety by reference. For a nationwide network, Network Time Protocol is preferred.

Figure 6:
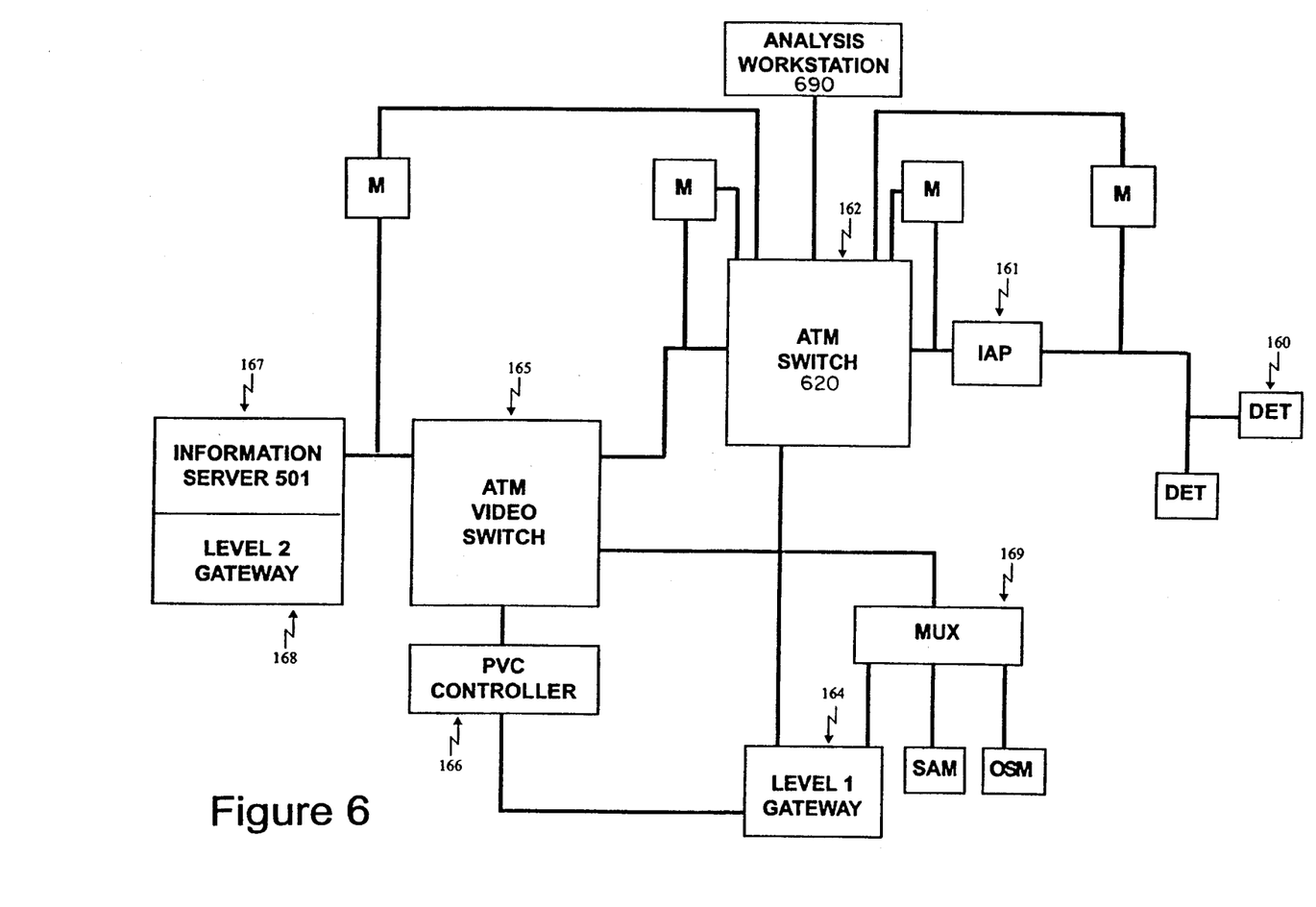
FIG. 6 illustrates the network of FIG. 2 modified to permit synchronization and data download over a common data network switch.

FIG. 6 illustrates an embodiment of the invention using the network of FIG. 2 in which the network analyzers are synchronized over a common data switch such as ATM switch 620 and in which the data is aggregated by each individual monitor uploading its data to analysis work station 690.

Figure 7:
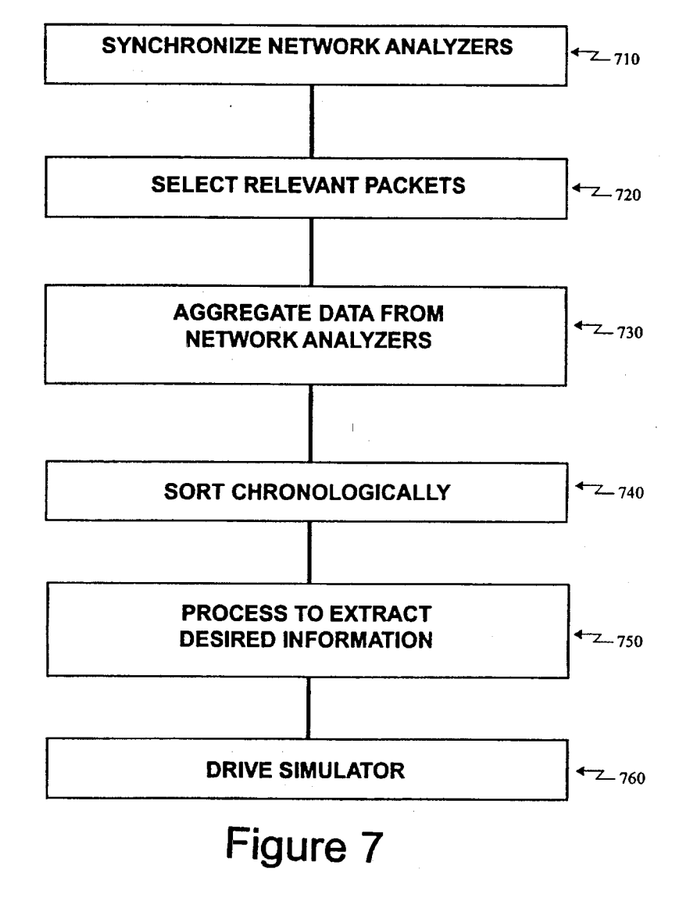
FIG. 7 is a flow chart of an algorithm utilized to perform network performance analysis from data gathered at a plurality of points within the network.

FIG. 7 is a flow chart illustrating the techniques of the invention. Step 710 involves synchronizing the network analyzers so that the time stamps applied to packets will be consistent and accurate throughout the network.

Step 720 is optional and permits a certain subset of packets to be selected for analysis and processing to the exclusion of unwanted information.

Data from network analyzers is aggregated in step 730 and sorted chronologically in step 740. Note that the data from the network analyzers may be data from all network analyzers or from only a subset of them.

Chronologically sorted data is processed to extract the desired information at step 750. Typically, this desired information will constitute one or more of a average packet latency between two points, b. packet latency distribution, c. packet sized distribution, d. packet sized minimum and/or maximum, e. packet fragmentation, f. packet loss, g. packet retransmission, h. sliding window algorithm efficiency, and i. throughput.

In order to extract these various kinds of information, data associated with any of the protocol layers the OSI reference model may be accessed and utilized.

Once the desired information is extracted from the sorted data, the desired information may be optionally provided to a simulator, e.g. in file format, where it will be utilized to directly define the performance parameters of various elements of the system under simulation.

Figure 8:
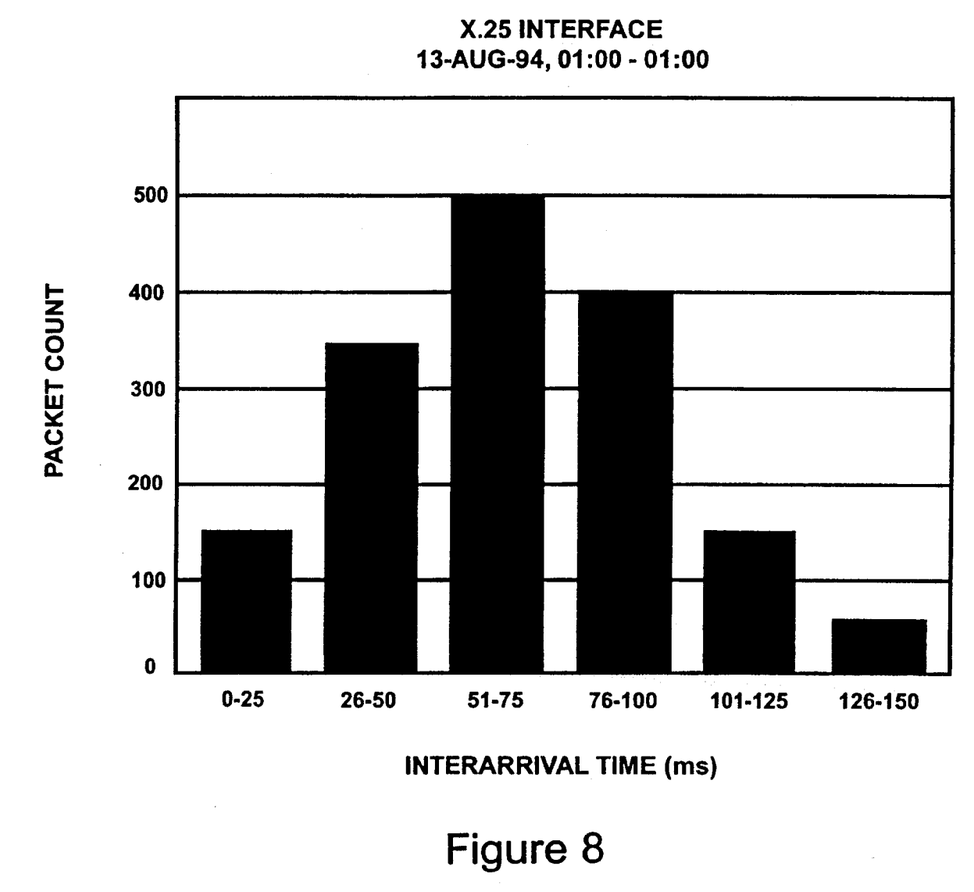
FIG. 8 illustrates a graphical display of interarrival time data captured using the network performance analyzer of the invention.

FIG. 8 illustrates one form of data output in which X.25 data is analyzed and a histogram of the interarrival times is plotted.

Figure 9:
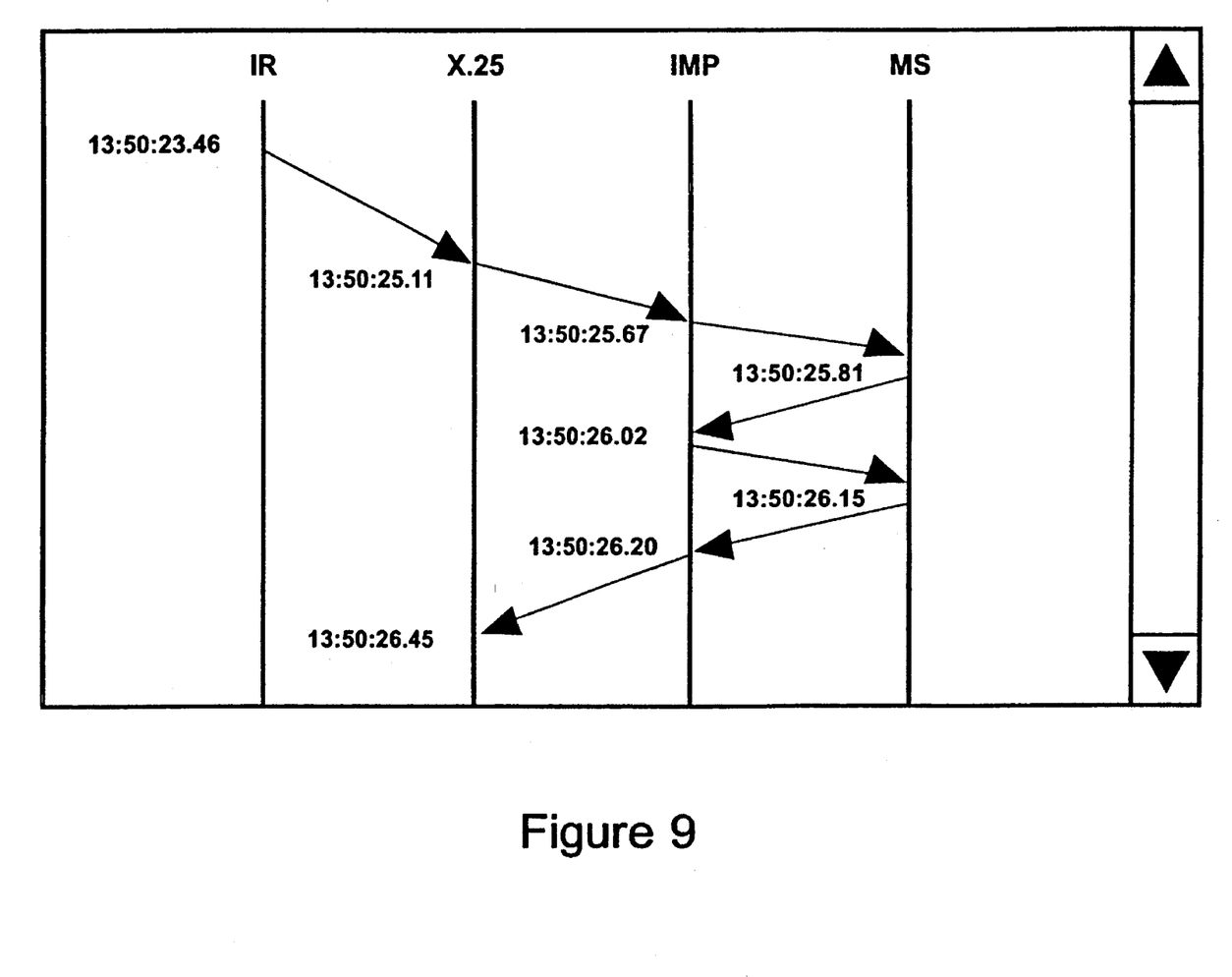
FIG. 9 is an illustration of a packet flow diagram utilized to represent data captured using the network performance analyzer according to the invention.

FIG. 9 illustrates another example of the kind of data which can be extracted from the sorted network analyzer data. FIG. 9 illustrates a graphical representation of the path of a packet from its origin at the infrared remote transmitter through the various monitor points in the network topology which it traverses.

Figure 10A:
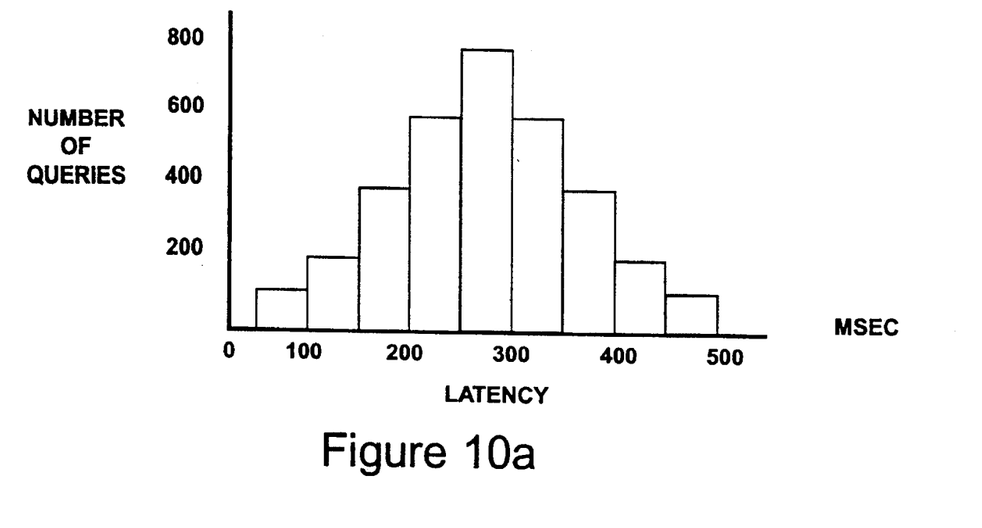
FIG. 10a shows a graphical representation of device latencies and FIG. 10b shows the raw data from which the graphical representation was created.
Figure 10B:
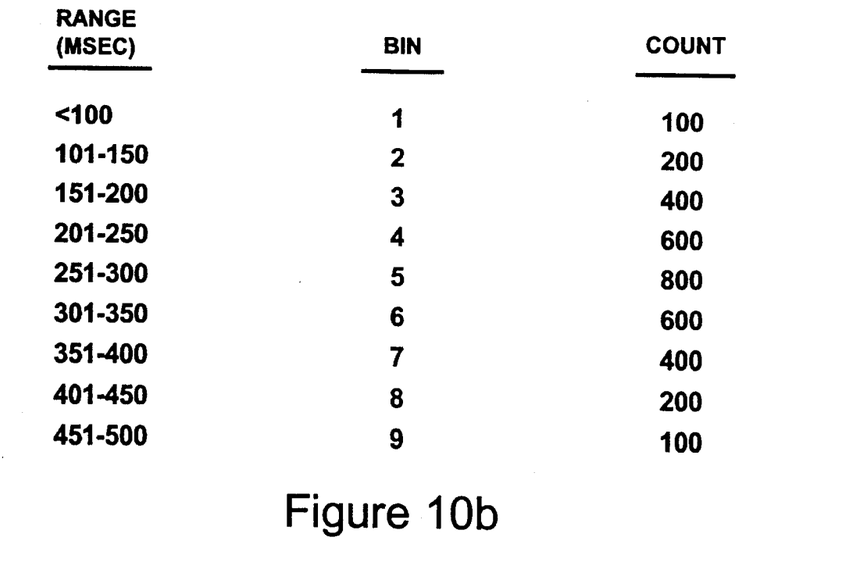

FIG. 10a illustrates a histogram of device latencies involved in, for example, SQL data base accesses. Data of interest going in and out of the SQL server is captured in one or more network analyzers which are synchronized with each other and the resulting data combined and sorted chronologically. The data is then analyzed for incoming and outgoing pairs of packets such that a query packet is associated with the subsequent response requested by the query and the time difference calculated. This enables the actual statistics of data base queries from various sources to be represented in a probability distribution which can be directly utilized in a simulation model. The raw data for the histogram of FIG. 10a is shown in FIG. 10b.

In some circumstances, it might be desirable to break down the various counts of each bin by source to identify the source of particularly long latencies so that performance improvement investigations can be undertaken.

Figure 11:
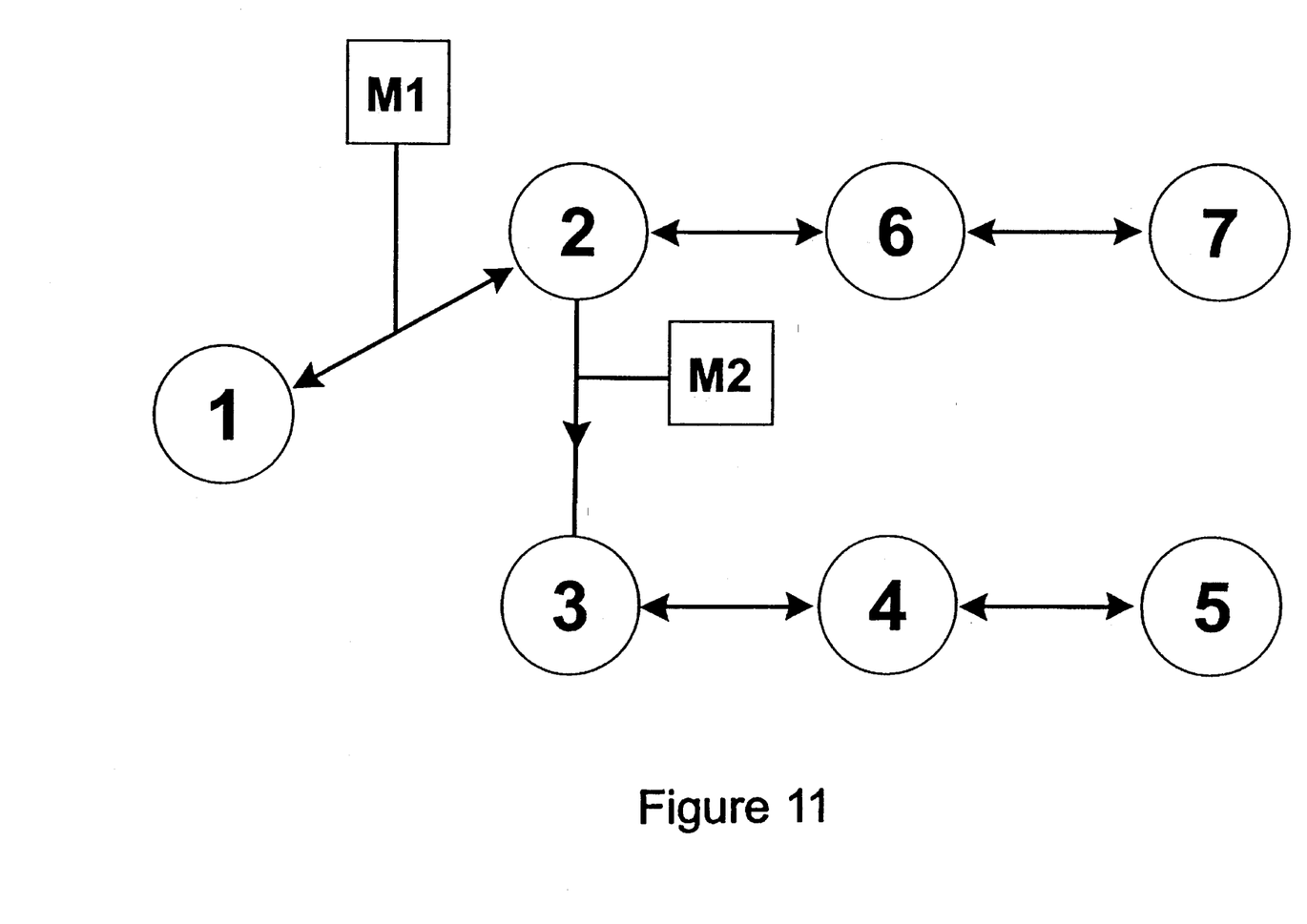
FIG. 11 illustrates the determination of network topology information utilizing the network performance analyzer of the invention when deterministic routing is utilized.

FIG. 11 illustrates how certain network topology information can be extracted from performance monitors located at various points in a network of unknown topology. In the example shown in FIG. 11, monitor M1 can see packets from nodes 1, 2, 6 and 7 only. Therefore, M1 might infer, correctly, that nodes 3, 4 and 5 cannot reach node 1.

With the addition of monitor M2, one can infer that nodes 3, 4 and 5 are connected to node 2 by considering the outgoing addresses from node 2 only and can conclude because there are never any incoming pockets to node 2 that the link to which monitor M2 is connected is unidirectional.

Figure 12:
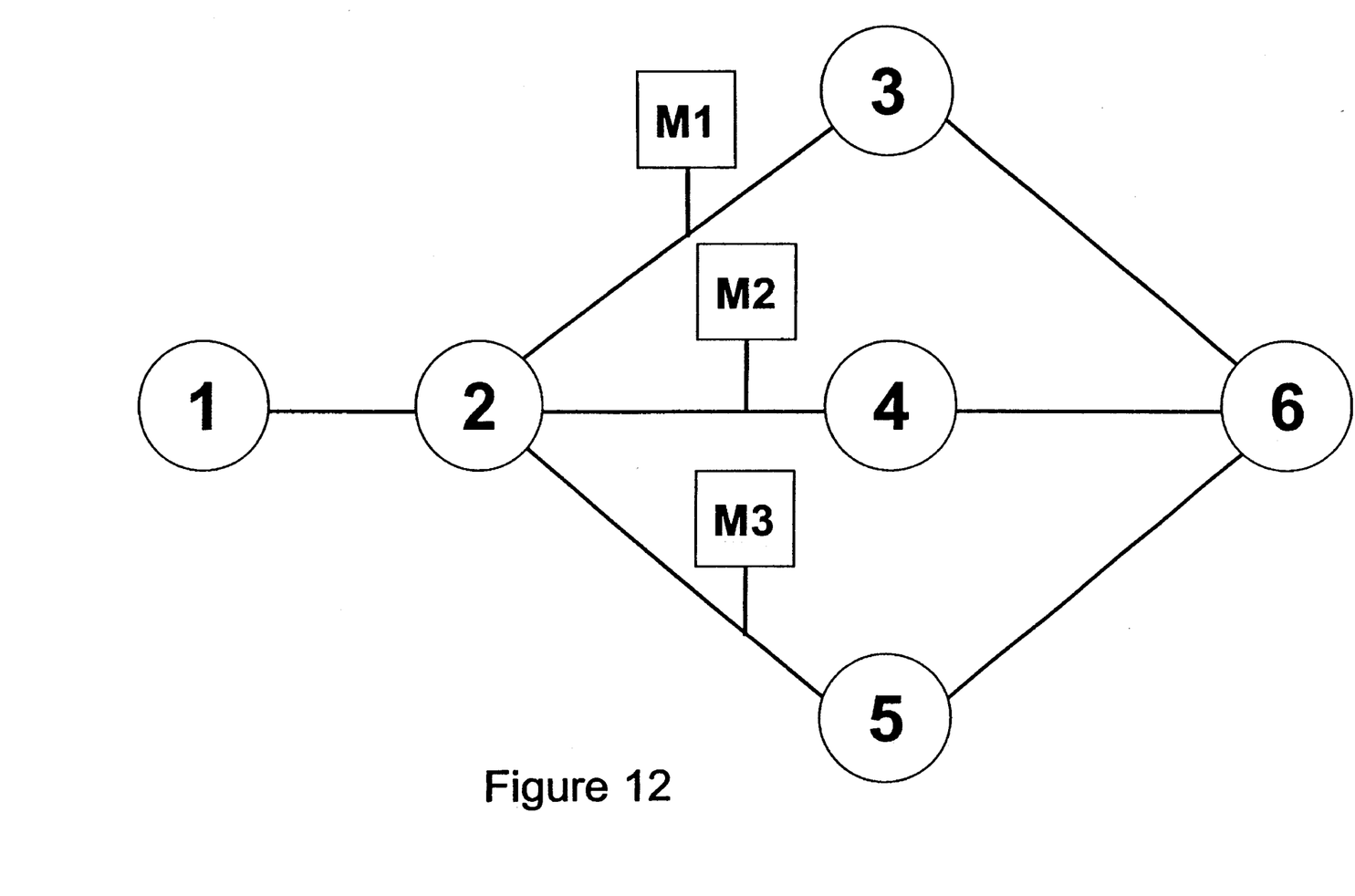
FIG. 12 is an illustration of how the network performance analyzer is utilized to determine routing probabilities at the output of a node when routing decisions are not deterministic.

FIG. 12 illustrates the use of network performance analyzer of the invention to determine network topological information in which routing decisions are made stochasticly. A number of packets, say 5,000, are addressed from node 1 to node 6. All of these must traverse node 2. If analyzers M1, M2 and M3 respectively report 1,000 packets, 1,000 packets and 3,000 packets, then one knows that the transition probabilities for the routing are such that the probability of being routed from node 2 to node 3 on the way to node 6 is approximately 0.20. Similarly, the probability of being routed from node 2 to node 4 on its way to node 6 is also 0.20. Finally, the probability of being routed from node 2 to 5 on the way to 6 is 0.60.

Thus, a variety of network topological information can be extracted from information gathered by the network performance analyzer of the invention.

By this disclosure, one can see that the prior art problems with network analyzers have been solved and a new and powerful tool for distributed networks of great complexity has been defined.

In this disclosure, there has been shown and described only the preferred embodiment of the invention, but, as aforementioned, it is to be understood that the invention is capable of use in various other combinations and environments and is capable of changes or modifications within the scope of the inventive concepts as expressed herein.

What is claimed is:

1. A network performance analyzer comprising:

a plurality of network analyzers, each having a clock and each connected to a point in a network;

means for synchronizing the clocks of said network analyzers;

means for aggregating data captured by said network analyzers, comprising means for placing all said data in a common file and for sorting said data chronologically; and means for analyzing said data to produce network performance information, comprising means for processing chronologically sorted data to extract desired information; wherein the desired information comprises one or more of:

a. average packet latency between two points,
b. packet latency distribution,
c. packet size distribution,
d. packet size minimum and/or maximum,
e. minimum and/or maximum latency
f. packet fragmentation,
g. packet loss,
h. packet retransmissions,
i. sliding window algorithm efficiency, and
j. throughput.

2. A network performance analyzer comprising:

a plurality of network analyzers, each having a clock and each connected to a point in a network;

means for synchronizing the clocks of said network analyzers;

means for aggregating data captured by said network analyzers, comprising means for placing all said data in a common file and for sorting said data chronologically; and means for analyzing said data to produce network performance information, comprising means for processing chronologically sorted data to extract desired information wherein comprises information about network topology.

3. A network performance analyzer comprising:

a plurality of network analyzers, each having a clock and each connected to a point in a network;

means for synchronizing the clocks of said network analyzers;

means for aggregating data captured by said network analyzers, comprising means for placing all said data in a common file and for sorting said data chronologically; and means for analyzing said data to produce network performance information, comprising means for processing chronologically sorted data to extract desired information wherein the desired information is used to drive a network simulator.

4. A network performance analyzer comprising:

a plurality of network analyzers, each having a clock and each connected to a point in a network;

means for synchronizing the clocks of said network analyzers;

means for aggregating data captured by said network analyzers, comprising means for placing all said data in a common file and for sorting said data chronologically; and means for analyzing said data to produce network performance information, comprising means for processing chronologically sorted data to extract desired information wherein the desired information is extracted from any of the physical, data link, network, transport, session, presentation or application portions of a protocol utilized to format captured packets.

5. The network performance analyzer of claim 4, in which said network analyzers each comprise at least one processor and said means for synchronizing the clocks of said network analyzers comprise:

a. a real time clock board connected to a bus of each said processor for synchronizing the clock of said processor with that of other processors b. an interconnection means linking real time clock boards of each network analyzers.

6. The network performance analyzer of claim 4, in which said network analyzers comprise at least one processor and said means for synchronizing the clocks of said network analyzers comprises an automated computer time service routine run on said processor.

7. The network performance analyzer of claim 4, in which said means for synchronizing the clocks of said network analyzers comprises means for implementing a network time protocol.

8. The network performance analyzer of claim 4, in which said network analyzers each comprise means for connecting the network analyzer to an external time reference and for synchronizing said clock with said time reference.

9. The network performance analyzer of claim 4, in which said means for synchronizing the clocks of said network analyzers comprises means for measuring round trip delay and for calculating and recording difference values between pairs of clocks and means for adjusting the timestamp associated with packets to correct for those difference values.

* * * * *